Figure 1:
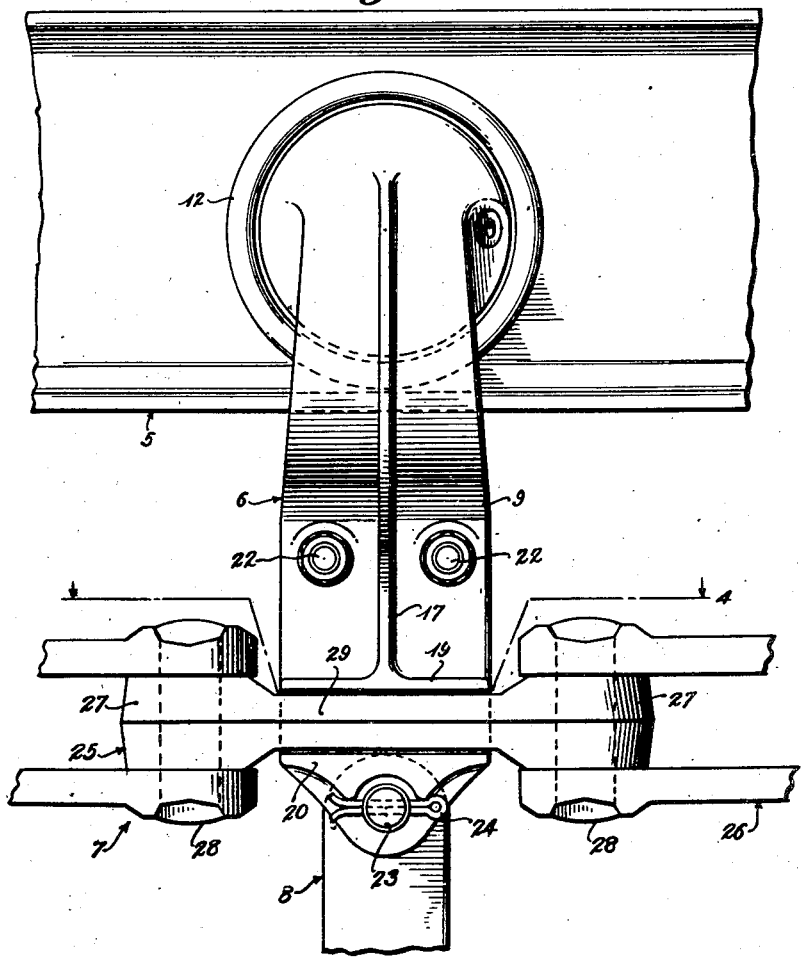

Dec. 3, 1946.　　　　R. W. SUMAN　　　　2,411,906
TROLLEY CONVEYER
Filed Oct. 18, 1944　　　　2 Sheets-Sheet 1

Inventor
Robert W. Suman
By L. Donald Myers
Attorney

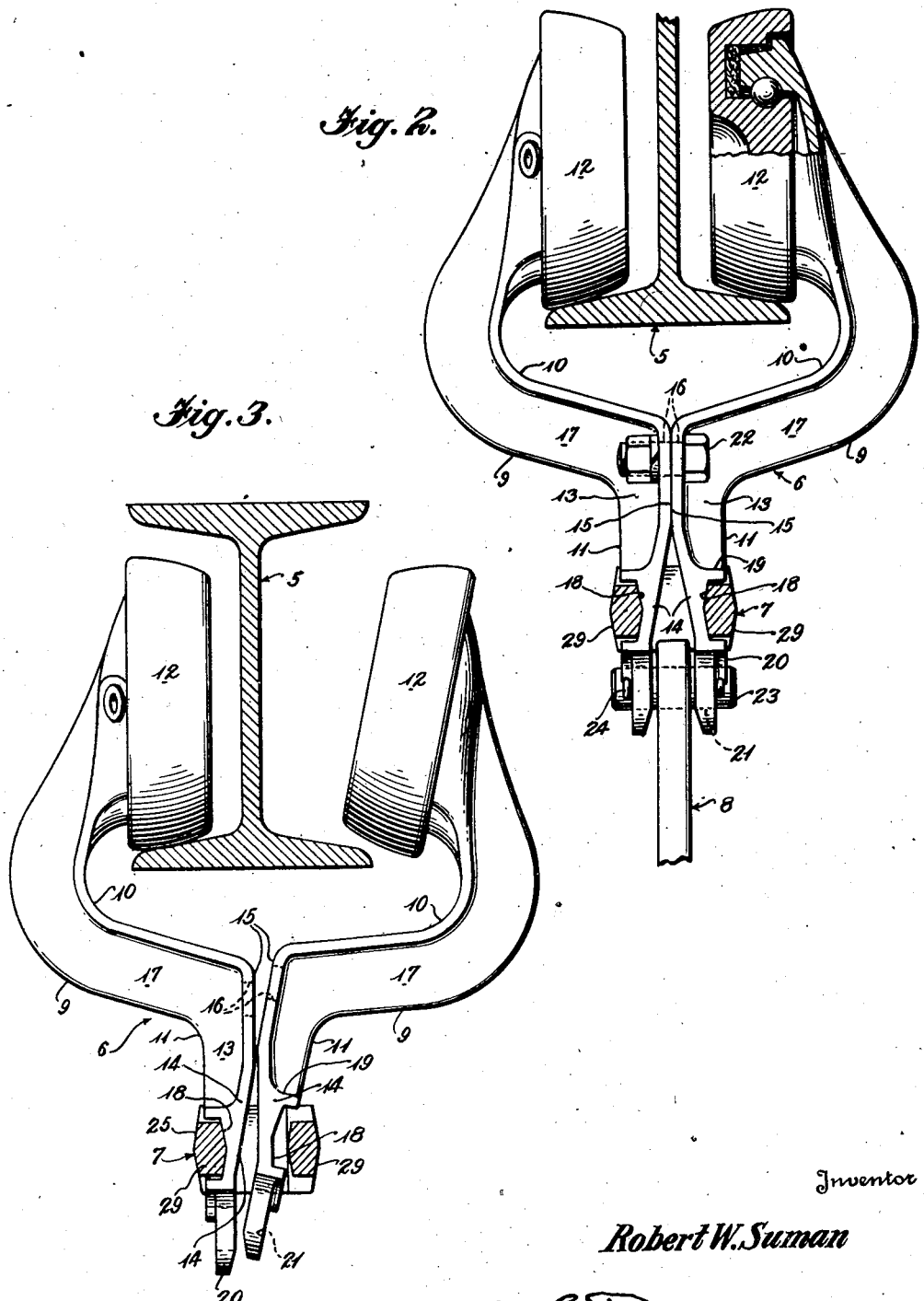

Patented Dec. 3, 1946

2,411,906

UNITED STATES PATENT OFFICE 2,411,906

TROLLEY CONVEYER

Robert W. Suman, Chicago, Ill., assignor to Link-Belt Company, a corporation of Illinois Application October 18, 1944, Serial No. 559,193

9 Claims. (Cl. 198—177)

This invention relates to new and useful improvements in trolley conveyers, and deals more specifically with the construction of the trolleys and their connections with the conveyer chain.

One of the primary objects of this invention is to provide a trolley construction for overhead conveyers which can be manufactured at a lower cost than trolleys now in general commercial use because the trolley brackets are designed so as to eliminate the need for attachments, spacers, fillers, or the like, that frequently involve intricate stampings; because the total weight of steel required to produce a trolley is less; and because the elimination of relatively small projections and pockets on the brackets permits them to be forged more economically and with less expense for the upkeep of die equipment.

A further primary object of the invention is to provide an overhead conveyer trolley, the two opposed bracket and wheel assemblies of which can be brought together in their permanent relationship with respect to each other, the I-beam track, and the conveyer chain, during either initial or replacement assembly of the trolley, with less work and expense and while the track is completely assembled, or closed throughout its length.

This last mentioned object is accomplished with the trolley construction embodying this invention because of the small number of parts to be handled and aligned by the assembler and the simple and novel manner in which the two bracket and wheel assemblies successively are positioned on the track and connected to the conveyer chain and then finally fastened together in permanent relationship.

Still another primary object of the invention is to provide a trolley for overhead conveyers which will possess greater strength and wear resistance than conventional trolleys.

Greater strength is provided because the trolley brackets are so constructed that the suspended load and the load resulting from chain pull on vertical track curves are delivered directly to the lower ends of the brackets, and not through attachments, spacers, fillers, or the like, and because the point of suspension of the load is raised to where it very closely approaches the center line of the chain and bears a close relation to the wheels.

Greater wear resistance is provided because the two brackets of a trolley, when assembled and fastened together in their permanent relationship, pass through an opening formed in an associated conveyer chain link for engagement with the link to eliminate relative sliding movements between the trolley and the chain and to provide maximum torsional stability of the trolley assembly about the chain link; and because each bracket is so fitted to its respective sides of the chain link that unbroken engagement surfaces are provided between the brackets and the side, top and bottom faces of said chain link sides throughout the width of the bracket.

Other objects and advantages of the invention will be apparent during the course of the following description.

Figure 4:
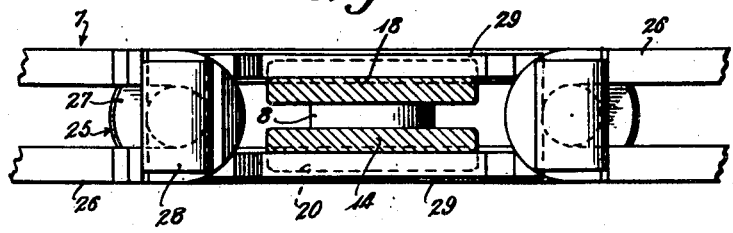

In the accompanying drawings forming a part of this specification and in which like numerals are employed to designate like parts throughout the same, Figure 1 is a fragmentary side elevational view of an overhead conveyer and more particularly illustrates the construction of the trolley, Figure 2 is an end elevational view of the trolley of Fig. 1 with a portion of one of the trolley wheels, the trolley track, and the conveyer chain shown in section, Figure 3 is a similar view to Fig. 2 but illustrates the manner in which the two opposed, similar brackets of the trolley are assembled with respect to the conveyer track and the conveyer chain, and Figure 4 is a horizontal sectional view taken on line 4—4 of Fig. 1.

In the drawings, wherein for the purpose of illustration is shown the preferred embodiment of this invention, the reference character 5 designates in its entirety the I-beam track of an overhead trolley conveyer. Such a conveyer will include a suitable number of trolleys 6 adapted to travel along the track 5 and to be connected at desired intervals to suitably spaced links of the endless chain conveyer 7. Each one of the trolleys 6 of the conveyer may have connected thereto a load carrier 8, which may take the form of a load hook, a tray pan, or the like.

By inspecting Figs. 1 and 2, it will be seen that the trolley is made up of two opposed, similar brackets 9. Each one of these brackets includes a head 10 and a foot 11. Each bracket head 10 has properly associated therewith a I-beam track engaging wheel 12. This track engaging wheel and the associated portion of the bracket head are fully described and claimed in the patent to Joseph Kucho, Jr., No. 2,333,867, issued November 9, 1943.

The construction of each bracket foot 11 is considered to be very unusual and quite novel in character. It includes what will be termed a heel portion 13 and an arch portion 14. The heel portion 13 is so constructed as to provide a flat contact surface 15 which is continuous throughout the width of the bracket and from the start of the arch portion 14 to the line of juncture with the bracket head 10 with the exception of the two bolt holes 16. It will be seen by particularly inspecting Figs. 1 and 2 that the longitudinal web 17, employed for stiffening and strengthening the bracket, extends throughout the length of each bracket heel portion 13 and along a portion of the arch 14.

The arch portion 14 of each bracket arm is formed by offsetting outwardly the inner face of the bracket foot or by reducing the overall thickness of the foot. The offsetting, or reduction in thickness, causes the inner face of the arch portion of the foot to extend outwardly at an acute angle with respect to the contact face 15.

The outer face of each bracket arch portion 14 is provided with a continuous groove 18 which is bounded on its top and bottom by the flanges 19 and 20, respectively. The lower end of each bracket foot 11 is provided with a pin receiving aperture 21.

Fig. 2 discloses the two opposed brackets 9 in the permanent relationship they assume when the trolley is properly assembled with its wheels 12 bearing on the I-beam track 5 and with the conveyer chain 7 properly connected to the lower end of the trolley. When in this permanent relationship, the flat contact surfaces 15 of the two bracket foot heel portions 13 are in direct engagement with each other. The two brackets are maintained in this proper assembled relationship by the two bolt and nut fastening devices 22. The aforementioned bolt apertures 16 accommodate these bolts. This direct engagement of the contact surfaces 15 causes the inner faces of the bracket foot arch portion 14 to diverge with respect to each other. Consequently, a space is provided between the two bracket foot arch portions 14 and this space is employed to accommodate the load carrier 8. A load carrying pin 23 passes through the apertures 21, formed in the lower ends of the bracket feet, and a suitable aperture formed in the load carrier 8 for connecting this load carrier to the trolley. Suitable cotter pins, or the like, 24 are employed for maintaining this connection.

The conveyer chain 7 is illustrated in Figs. 1 and 4 as including alternate center links 25 and outside links 26. This chain is of conventional construction and is of the rivetless type. The center link 25 is of open construction and includes the enlarged heads, or thickened end portions, 27 through which the headed chain pins 28 pass. The opposite sides 29 of this center link are arranged in parallelism with each other throughout their lengths.

Figs. 1, 2 and 4 disclose the assembled trolley as having its two bracket feet 11 extending through the central opening of the conveyer chain center link 25 and as having the two sides 29 of this link occupying the transverse grooves 18 formed in the arches 15 of the bracket feet 11. Fig. 1 discloses the fact that the width of each trolley bracket substantially corresponds with the length of its respective side 29 of the center link 25. Figs. 1 and 2 disclose the fact that the transverse groove 18 is so shaped in section as to provide unbroken engagement surfaces, throughout the width of the bracket, for the top, bottom and inner side faces of the associated center link side 29. This relationship that exists between the arch portions of the trolley brackets and the sides 29 of the chain center link 25 provides maximum torsional stability of the trolley assembly about the chain link and long-life wear resisting surface engagement between the trolley and the chain link.

Fig. 3 of the drawings has been provided to illustrate the manner in which the two bracket and wheel assemblies of a trolley are brought into assembled relationship with respect to the I-beam track 5 and the conveyer chain 7. This figure shows one of the bracket and wheel assemblies fully positioned; i. e., with its wheel 12 bearing on the track 5 and with its foot 11 threaded into the central opening of the center link 25 so that the side 29 of this link will occupy the transverse groove 18. Due to the offset character or reduced thickness of this positioned foot arch 14, a substantial amount of space is provided between the inner face of the arch and the opposed side 29 of the center link 25.

This space allows for the threading or lacing of the offset or reduced arch portion 14 of the second bracket and wheel assembly into the central opening of the chain link. In other words, the arched or offset characteristics of these two bracket feet 11 enables the two brackets to be collapsed, or reduced in total thickness, to permit the second bracket foot to be inserted in the opening of the center link 25 until the transverse groove 18 of the second bracket registers with the side 29 of the link. When this relationship exists, the second bracket and wheel assembly can be rocked into parallelism with the previously positioned bracket and wheel assembly and these two assemblies then will have assumed their permanent relationship. This relationship is then maintained by positioning the two bolt and nut fastening devices 22.

It will be obvious that this method of assembling a trolley makes it possible to connect the lower end portion of the trolley to the conveyer chain and position the two bracket wheels on the track without having to open up the track. Additionally, this assembling of a trolley is very easy and inexpensive to accomplish because of the relatively small number of parts that must be handled and aligned by an assembler.

It, further, will be obvious that the elimination of any need for attachments, fillers, spacers, or the like will effect a substantial reduction in the production cost of this type of trolley over trolleys of conventional construction. The ability to directly connect the load carrier 8 to the lower end of the trolley provides greater strength because the suspended load and the load resulting from chain pull on vertical track curves are delivered directly to the lower ends of the brackets and not through attachments, or the like, and the point of suspension of the load is raised to where it very closely aproaches the central line of the chain.

The construction of the trolley brackets, with all relatively small projections and pockets eliminated, permits the brackets to be forged more economically and with less expense for the upkeep of die equipment.

It is to be understood that the form of this invention herewith shown and described is to be taken as a preferred example of the same, and that various changes in the shape, size, and arrangement of parts may be resorted to without departing from the spirit of the invention or the scope of the subjoined claims.

Having thus described the invention, I claim:

1. In a conveyer, the combination with a track, and a chain having a link formed with an opening, of a trolley comprising two similar oppositely disposed brackets each having a head carrying a track engaging wheel and a foot through the medium of which the two brackets are fastened together in permanent relationship and are connected to the chain link, said bracket feet having means operating to connect the chain link to the bracket feet as the result of the brackets being moved to their assembled position within the chain link opening and also being shaped so that portions of the same will directly engage each other to position the two brackets in the permanent realtionship they assume when fastened together and so that other portions have their inner faces offset outwardly to permit the two feet to be collapsed relative to each other to allow for insertion in the chain link opening, and means for fastening the two brackets together in their aforesaid permanent relationship with the feet extending through the chain link opening.

2. In a conveyer, the combination with a track, and a chain having a link formed with an opening, of a trolley comprising two similar oppositely disposed brackets each having a head carrying a track engaging wheel and a foot through the medium of which the two brackets are fastened together in permanent relationship and are connected to the chain link, said bracket feet being shaped so that portions of the same will directly engage each other to position the two brackets in the permanent relationship they assume when fastened together and so that other positions have their inner faces offset outwardly to permit the two feet to be collapsed relative to each other to allow for insertion into the chain link opening, means for fastening the two brackets together in their aforesaid permanent relationship with the feet extending through the chain link opening, and each bracket foot having a transverse groove formed in its outer face to receive the associated side of the chain link for connecting the chain to the trolley.

3. In a conveyer, the combination with a track, and a chain having a link formed with an opening, of a trolley comprising two similar oppositely disposed brackets each having a head carrying a track engaging wheel and a foot through the medium of which the two brackets are fastened together in permanent relationship and are connected to the chain link, said bracket feet having means operating to connect the chain link to the bracket feet as the result of the brackets being moved to their assembled position within the chain link opening and also being shaped to provide normally registering heel portions and portions which are offset outwardly relative to the heel portions, said heel portions being directly engageable with each other to position the two brackets in permanent relationship as assumed when fastened together, said offset portions permitting the bracket feet to be collapsed relative to each other to allow for insertion into the chain link opening, and means for fastening the two brackets together in their aforesaid permanent relationship with the feet extending through the chain link opening.

4. In a conveyer, the combination with a track, and a chain having a link formed with an opening, of a trolley comprising two similar oppositely disposed brackets each having a head carrying a track engaging wheel and a foot through the medium of which the two brackets are fastened together in permanent relationship and are connected to the chain link; each of said bracket feet being shaped to provide a heel portion having a flat surface on its inner side, a portion arching outwardly away from the plane of said flat surface, and a transverse groove formed in the outer face of said arched portion; said brackets being adapted to have their flat heel surfaces directly engaging each other and their arched portions passing through the chain link opening with the sides of the link occupying the transverse foot grooves when the two brackets are positioned in the permanent relationship they assume when fastened together with their wheels engaging the track and to be assembled in said permanent relationship by first completely positioning one bracket and then, while the second bracket is arranged at an angle to the positioned bracket, threading its arched foot portion into the opening of the chain link until its transverse groove registers with the remaining side of the chain link and, by swinging the second bracket into its said permanent relationship, cause the wheel to bear upon the track, its heel surface to engage the heel surface of the positioned bracket, and the side of the chain link to occupy its groove; and means for fastening the two brackets together in their aforesaid permanent relationship.

5. In a conveyer, the combination with a track, and a chain having a link formed with an opening, of a trolley comprising two similar oppositely disposed brackets each having a head carrying a track engaging wheel and a foot through the medium of which the two brackets are fastened together in permanent relationship and are connected to the chain link; each of said bracket feet being shaped to provide a heel portion having a flat surface on its inner side, a portion arching outwardly away from the plane of said flat surface, and a transverse groove formed in the outer face of said arched portion; said brackets being adapted to have their flat heel surfaces directly engaging each other and their arched portions passing through the chain link opening with the sides of the link occupying the transverse foot grooves when the two brackets are positioned in the permanent relationship they assume when fastened together with their wheels engaging the track and to be assembled in said permanent relationship by first completely positioning one bracket and then, while the second bracket is arranged at an angle to the positioned bracket, threading its arched foot portion into the opening of the chain link until its transverse groove registers with the remaining side of the chain link and, by swinging the second bracket into its said permanent relationship, cause the wheel to bear upon the track, its heel surface to engage the heel surface of the positioned bracket, and the side of the chain link to occupy its groove; means for fastening the two brackets together in their aforesaid permanent relationship, a load carrier extending into the space provided between the opposed arched portions of the bracket feet, and means for fastening the load carrier directly to the bracket feet.

6. A trolley for overhead conveyers, comprising two similar oppositely disposed brackets each having a head carrying a track engaging wheel and a foot for connection with a chain, the feet of said brackets having inside surface portions directly engaging each other and outside transverse grooves to receive the sides of a chain link when the brackets are fastened together in their permanent relationship and also having additional inside surface portions which are offset outwardly relative to the first mentioned surface portions to reduce the thickness of the feet so that they can be collapsed for insertion in a chain link opening, and means for fastening said brackets together.

7. A trolley for overhead conveyers, comprising two similar, oppositely disposed brackets each having a head carrying a track engaging wheel and a foot for connection with a chain, the feet of said brackets having inside surface portions directly engaging each other and outside transverse grooves to receive the sides of a chain link when the brackets are fastened together in their permanent relationship and also having additional inside surface portions which are offset outwardly relative to the first mentioned surface portions to reduce the thickness of the feet so that they can be collapsed for insertion in a chain link opening, means for fastening said brackets together, a load carrier, and means for fastening said load carrier directly to said bracket feet.

8. In a conveyer, the combination with a track, and a chain having a link formed with an opening, of a trolley comprising two similar oppositely disposed brackets having heads for carrying track engaging wheels and feet through the medium of which the brackets are located in their permanent relationship and are connected together and to the chain link, said bracket feet having chain link engaging means on their outer sides and having their inner sides shaped to provide engagement portions and also other portions which are offset outwardly relative to said engagement portions, said engagement and offset portions of the two bracket feet being so relatively arranged that the feet can be collapsed relative to each other for insertion in the chain link opening to permit the brackets to be arranged in their permanent relationship with the engagement portions of their feet directly engaging each other and with the chain link held by the said engaging means of the bracket feet, and means for fastening said brackets together in their permanent relationship.

9. In a conveyer, the combination with a track, and a chain having a link formed with an opening, of a trolley comprising two similar oppositely disposed brackets having heads for carrying track engaging wheels and feet through the medium of which the brackets are located in their permanent relationship and are connected together and to the chain link, said bracket feet having chain link receiving grooves formed in their outer sides and having their inner sides formed with heel portions and with other portions that are offset outwardly relative to said heel portions, said heel and outwardly offset portions of the two bracket feet being so relatively arranged that the bracket feet can be collapsed relative to each other for insertion in the chain link opening to permit the brackets to be arranged in their permanent relationship with the heel portions of their feet directly engaging each other and with the chain link occupying the said grooves, and means for fastening said brackets together in their permanent relationship.

ROBERT W. SUMAN.